(12) United States Patent
Zhang

(10) Patent No.: US 7,070,637 B1
(45) Date of Patent: Jul. 4, 2006

(54) APPARATUS FOR SEPARATING PARTICLES FROM A FLUID

(75) Inventor: Yuanhui Zhang, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 70 days.

(21) Appl. No.: 10/728,402

(22) Filed: Dec. 5, 2003

Related U.S. Application Data

(60) Provisional application No. 60/441,712, filed on Jan. 21, 2003.

(51) Int. Cl.
*B01D 45/12* (2006.01)

(52) U.S. Cl. .......................... 55/347; 55/348; 55/396; 55/438; 55/457

(58) Field of Classification Search ................. 55/438, 55/439, 423, 466, 347, 348, 396, 457
See application file for complete search history.

(56) References Cited

U.S. PATENT DOCUMENTS

| 2,201,301 A | * | 5/1940 | Richardson | .................. 55/397 |
| 2,509,172 A | * | 5/1950 | Schreier et al. | ............. 261/79.2 |
| 2,847,087 A | * | 8/1958 | Johnson | ........................ 55/338 |
| 2,936,043 A | * | 5/1960 | Armstrong et al. | ............ 55/416 |
| 5,186,607 A | * | 2/1993 | Yang et al. | .................. 415/183 |

OTHER PUBLICATIONS

Zhang et al., ASHRAE Transactions 2001: "Particle Separation Efficiency of a Uniflow Deduster with Different Types of Dusts", vol. 107, Part 2 (Jun. 22, 2001).

* cited by examiner

*Primary Examiner*—Robert A. Hopkins
(74) *Attorney, Agent, or Firm*—Greer, Burns & Crain, Ltd.

(57) ABSTRACT

A particle separation device for removing particles from a fluid. An embodiment of the device includes a particle separation chamber with an annular tunnel. A plurality of inlet vanes extend within the annular tunnel for imparting a helical fluid flow by deflecting the fluid at an discharge angle. The vanes are shaped so that a deflection angle of the fluid moving along a surface of the inlet vanes varies smoothly from an initial axial direction as the fluid enters the vanes to the discharge angle as the fluid exits the vanes. A particle separation system includes a plurality of particle separation modules arranged in an array. A multi-annular particle separation apparatus includes a plurality of concentric particle separation devices.

11 Claims, 17 Drawing Sheets

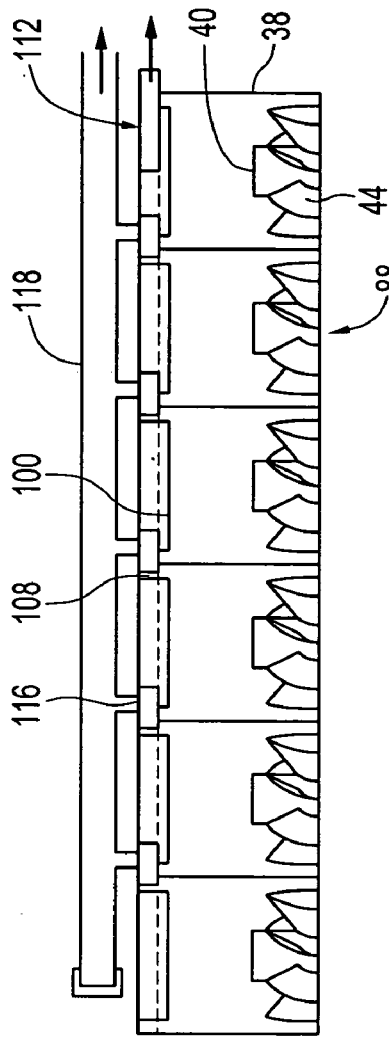
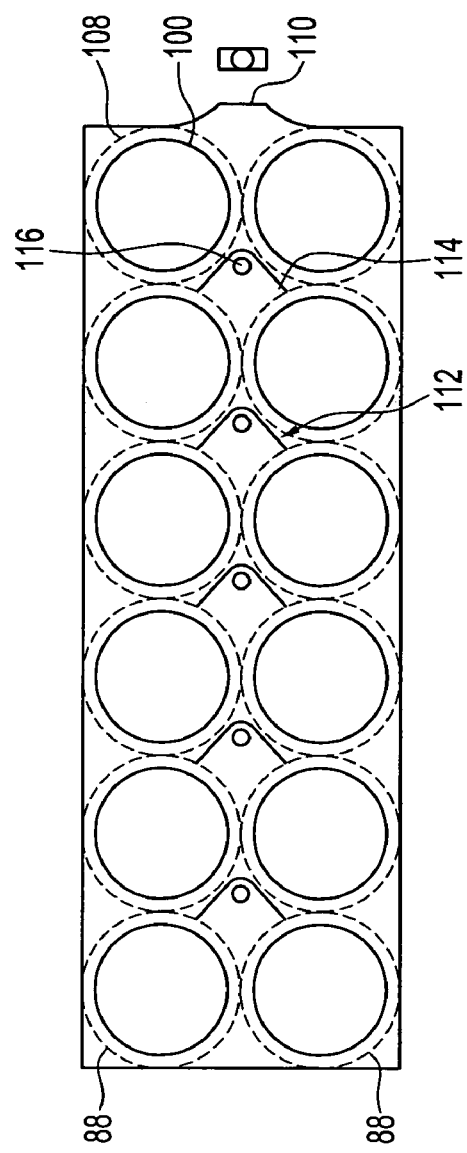

APPARATUS FOR SEPARATING PARTICLES FROM A FLUID

PRIORITY CLAIM

This application claims priority of U.S. Provisional Application Ser. No. 60/441,712, filed Jan. 21, 2003, under 35 U.S.C. § 119.

FIELD OF THE INVENTION

The present invention relates generally to devices and methods for removing particles from a fluid.

BACKGROUND OF THE INVENTION

It is desirable to remove particles from a fluid for improving cleanliness or safety of an environment, for removing undesirable particles that otherwise may interfere with efficiency or operational life of a device, or for other purposes. It is also important in many applications to remove particles in an efficient and economical way, and to remove particles having a relatively small size.

There are many existing methods for removing particles from a fluid (for example, air). Contact-based methods may be used, such as fiber and other media filters and water or oil scrubbers. Another particle removal method employs electrostatic precipitators. However, such methods often require relatively large quantities of airflow through filtration media so that particles may be captured and removed from the air. Fiber and electrostatic filters, for example, require a medium for making physical contact with the particles to remove them from an air stream. Particles quickly accumulate onto the filtration media, and thus the media is cleaned or replaced frequently, resulting in high maintenance costs. For many dusty environments, such an air cleaning process requires frequent maintenance, including replacement of filters.

Other, non-contact air cleaning devices remove particles from a fluid aerodynamically, rather than by passing the fluid through a filtration media. Certain non-contact devices use centrifugal force to separate particles from a main air stream. These so-called cyclones create spiral airflow at a very high speed to separate particles from the air. The tornado-like particle separation process involves no contact media, and thus does not require frequent cleaning or replacement of a filter media. Additional non-contact devices include louver and baffle types, and settling chambers.

There are two principal types of cyclone air cleaning devices: return flow and uniflow. A return flow cyclone allows air to return, while a uniflow cyclone does not. Due to differences in airflow between these two types of devices, the particle separation processes are quite different.

A large amount of research has been conducted for return flow aerodynamic air cleaning devices, for example, for air sampling purposes, while a relatively smaller amount of research has been conducted for uniflow cyclones. However, though return flow cyclones allow a small particle cutsize (the size of a particle for which collection efficiency is at least 50%), they are energy intensive and have low dust separation efficiency. Furthermore, airflow velocities are very high in conventional cyclones. Accordingly, high turbulence and reentrainment of particles occur, resulting in low particle separation efficiency, especially for small particles.

Traditional cyclone particle separation devices have exhibited great difficulty in separating particles smaller than 10 μm from air. Separation of only larger particle sizes, however, is not particularly useful for conventional air cleaning purposes.

SUMMARY OF THE INVENTION

The present invention provides a particle separation device for removing particles from a fluid. An embodiment of the device includes a particle separation chamber with an annular tunnel. A plurality of inlet vanes extend within the annular tunnel for imparting a helical fluid flow by deflecting the fluid at an discharge angle. The vanes are shaped so that a deflection angle of the fluid moving along a surface of the inlet vanes varies smoothly from an initial axial direction to the discharge angle. The present invention further provides a particle separation system that includes a plurality of particle separation modules arranged in an array. Still further, the present invention provides a multi-annular particle separation apparatus that includes a plurality of concentric particle separation devices.

BRIEF DESCRIPTION OF THE DRAWINGS

FIGS. 11A and 11B show a sectional view of particle separation modules and an array of bunker outlets, respectively, according to an embodiment of the present invention;

DETAILED DESCRIPTION OF THE INVENTION

The present invention provides apparatuses and methods for removing particles from a fluid. Preferred embodiments of the present invention provide particle separation devices based on a uniflow aerodynamic separation principle. The particle separation device is preferably capable of separating particles with a density higher than air.

A preferred particle separation device according to an embodiment of the present invention includes a separation chamber. The separation chamber is outwardly defined by an outer cylinder, and further includes an inner member centrally disposed within the outer cylinder of the particle separation device to define, with the outer cylinder, an annular tunnel along at least part of the separation chamber. Stationary inlet vanes are located between the inner member and the outer cylinder. Fluid is pulled or pushed by a pressure generating device along the inlet vanes, where the fluid is deflected from an axial flow as it enters the inlet vanes to an exit angle as it exits the inlet vanes. This imparts a substantially helical flow to the fluid. After passing through the inlet vanes, the fluid flows through the separation chamber in a helical path within the outer cylinder towards an outlet.

The inlet vanes extend between an outer surface of the inner member and the inner surface of the outer cylinder. Each of the inlet vanes has an arced shape, so that a moving fluid deflected by the inlet vanes follows a discharge angle that varies smoothly between an entry surface of the inlet vanes and an exit surface of the inlet vanes. The discharge angle of fluid contacting the surface of the vanes thus varies smoothly between axial flow and the exit angle. In this way, the fluid follows an arced path as it passes through the inlet vanes. Accordingly, the inlet vanes minimize fluid resistance and turbulence, and improve efficiency of the particle separation device. A preferred particle separation device also allows removal of very small particle sizes (such as respirable particles smaller than 4 μm).

An additional embodiment of the present invention provides a uniflow particle separation system having a plurality of particle separation modules arranged in an array. Another embodiment of the present invention provides a multi-annular particle separation device having concentric particle separation chambers.

Figure 1:
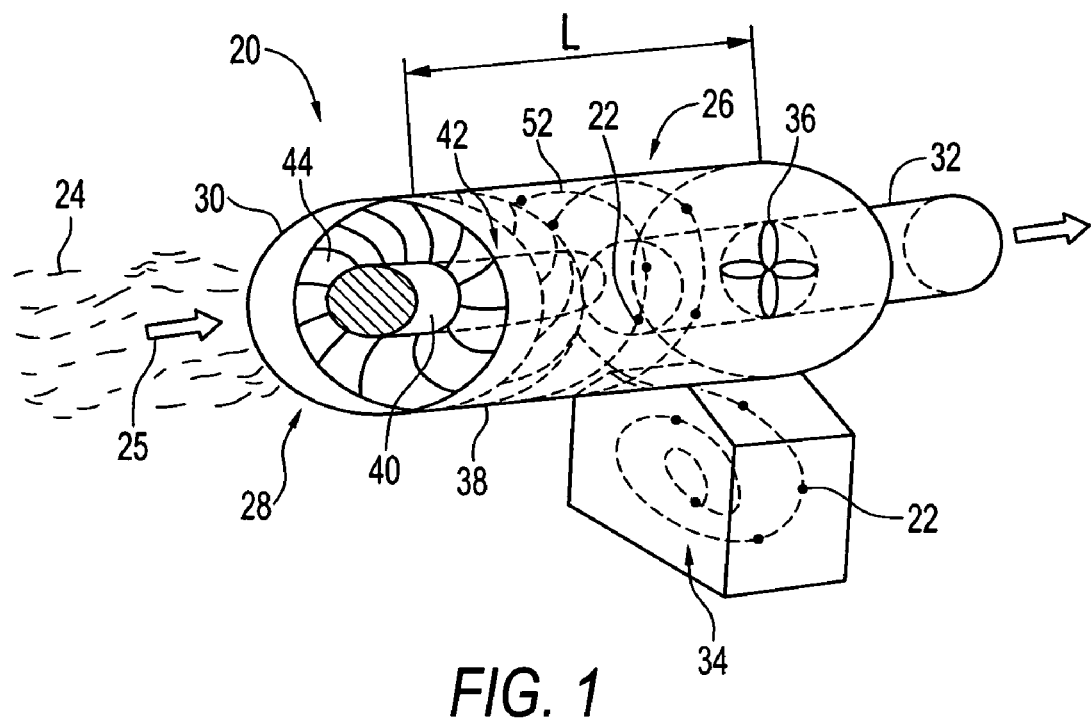
FIG. 1 is a perspective view of a uniflow cyclone particle separation device according to a preferred embodiment of the present invention.

Referring now to the drawings, FIG. 1 shows a particle separation device 20 for aerodynamic separation of particles 22 from a fluid 24, such as air. The particle separation device 20 operates on the uniflow principle. The fluid 24 travels along an axial path 25 into the particle separation device 20, and through a separation chamber 26, where the particles 22 are separated from the fluid. The fluid 24 enters the particle separation chamber 26 through an inlet 28. An inlet guide (not shown) having a smooth surface may be provided for guiding the fluid 24 into the separation chamber 26. For example, a bell-shaped inlet guide may be used.

The particle separation device 20 further includes an outlet 32, where the fluid 24 exits the particle separation device after removal of the particles 22. For example, and as shown in FIG. 1, the outlet 32 may be a substantially cylindrical tube, an aperture, or other passage disposed downstream of the separation chamber 22. A collection apparatus 34, such as a bunker, connects to the separation chamber 26 downstream, and collects the particles 22 that are removed from the fluid 24. The dimensions of the particle separation chamber 26 can vary according to individual design objectives and constraints.

A fluid pressure generator 36, for example a fan or other suitable device, in fluid communication with the separation chamber 26 creates a pressure drop between the inlet 28 and the outlet 32 to move the fluid 24 through the particle separation device 20. Preferably, and as shown in FIG. 1, the fluid pressure generator 36 is disposed downstream of the separation chamber 26, to pull the fluid 24 through the outlet 32 and thus through the separation chamber. However, the fluid pressure generator 28 may instead be located upstream of the separation chamber 26 to push the fluid 24 through the inlet 28 and through the separation chamber, though this may result in additional turbulence. The fluid pressure generator 36 is powered by a suitable power source (not shown).

The particle separation chamber 26 is outwardly defined by an axially extending outer cylinder 38 for confining the moving fluid 24 within the chamber and allowing the fluid to travel in a helical path. An inner member 40 within the chamber 26 extends coaxially with at least a portion of the outer cylinder 38, so that the inner member and the outer cylinder cooperatively define an annular tunnel 42 extending at least partially though the particle separation chamber along an axial direction. The inner member 40 may be a cylinder, for example, or have a cylindrical portion, and may be solid, partially solid, or hollow. The fluid 24 passes through the annular tunnel 42 as it enters the chamber 26.

A plurality of stationary inlet vanes 44 guide the fluid 24 entering the separation chamber 26, and impart a helical flow to the fluid. Each of the plurality of inlet vanes 44 extend from an outer cylindrical surface of the inner member 40 to an inner cylindrical surface of the outer cylinder 38. The inlet vanes 44 are preferably symmetrically disposed about the annular tunnel 42.

The inlet vanes 44 are shaped and arranged to deflect the input fluid stream from the original linear, axial path 25 at a discharge angle α (shown in FIG. 2) and toward the inner surface of the outer cylinder 38 as the fluid 24 is drawn through the inlet vanes by the pressure generating device 36. The discharge angle α is the angle the fluid 24 exiting the inlet vanes 44 travels with respect to the axial direction 25, and is defined by the angle at an exit 60 of the inlet vanes between the tangential direction 50 of the inlet vane and the axial direction. The surface of the outer cylinder 38 constrains the deflected fluid stream, so that as the fluid 24 travels through the chamber 26, it moves in a helical path 52 about the axis of the outer cylinder 38 and through the separation chamber 26.

The number and specific configuration of the inlet vanes 44 may vary according to desired conditions. A number of design tradeoffs exist. For example, greater distance between the inlet vanes 44, or between the inner member and outer cylinder 40, 38, results in greater turbulence. Thus, when the dimensions of the particle separation device 20 are large, more inlet vanes should be used. Preferably, the distance between the inlet vanes 44 should not exceed the distance of the gap between the inner member 40 and the outer cylinder 38. However, while fewer inlet vanes may result in more turbulence, more inlet vanes will likely add to the cost of the particle separation device. Also, more inlet vanes increase the pressure drop required, thus requiring more energy to move the fluid 30 through the separation device. The desired discharge angle α is a tradeoff between cutsize (a greater angle yields a smaller cutsize) and the pressure drop (more pressure drop is required for a greater angle). The number of the inlet vanes 44 and the discharge angle α may vary depending on the desired results of the particle separation device 20.

In operation, the fluid 24 is drawn though the annular tunnel 42 and along the inlet vanes 44 by the pressure generating device 36, creating a swirl angle of the fluid stream and the particles 22 within the fluid. The fluid flow has a circular component about the axis of the outer cylinder 38 and an axial component along the axis, thus following the helical (or spiral) path 52. Particles 22 following the helical path 52 move toward the inner surface of the outer cylinder 38 because of their weight. As the particles 22 travel through the separation chamber 26, they move from an initial radial position $r_{p1}$, to a final radial position $r_{p2}$, where $r_{p2} > r_{p1}$. The particles 22 move outward in the circular part of the fluid flow, and ultimately reach the inner surface of the outer cylinder 38. While the fluid 24 reaches the outlet 32 and exits, the particles 22 reaching the inner surface of the outer cylinder 38 are separated from the fluid 24. A small percentage of the particles 22 pass through the outlet 32. The particles 22 preferably are collected in the collection chamber 34 connected to the separation chamber 26.

Fluid flow through the separation chamber 26 is always to some extent turbulent. Turbulence in the radial direction introduces reentrainment of the particles 22 and thus reduces the particle separation efficiency. Higher turbulence intensity results in greater reentrainment of the particles 22 back to the fluid flow, and thus provides lower particle separation efficiency and higher cutsize. Particle cutsize in the particle separation device 20 is a function of at least: the particle reintrainment ratio ($k_{pr}$); air viscosity (μ); average radius of the annular tunnel 42 ($R_a$); the gap of the annular tunnel 42 (d); the vane discharge angle (α); the tangential fluid (air) velocity ($V_θ$); and the length of the annular tunnel 42 (after the fluid exits the inlet vanes 44) (L). The particle reentrainment ratio $k_{pr}$ is a ratio of particles at a given size reentrained back to the fluid flow to the particles at the given size that should have been separated under conditions of no reentrainment. The ratio $k_{pr}$ ranges from 0 to 1 and is related to the turbulence; i.e. the higher the turbulence intensity, the higher the re-entrainment ratio of particles. When no turbulence exists, for example, $k_{pr}=0$, and when turbulence intensity is extremely high, $k_{pr}=1$.

Figure 2:
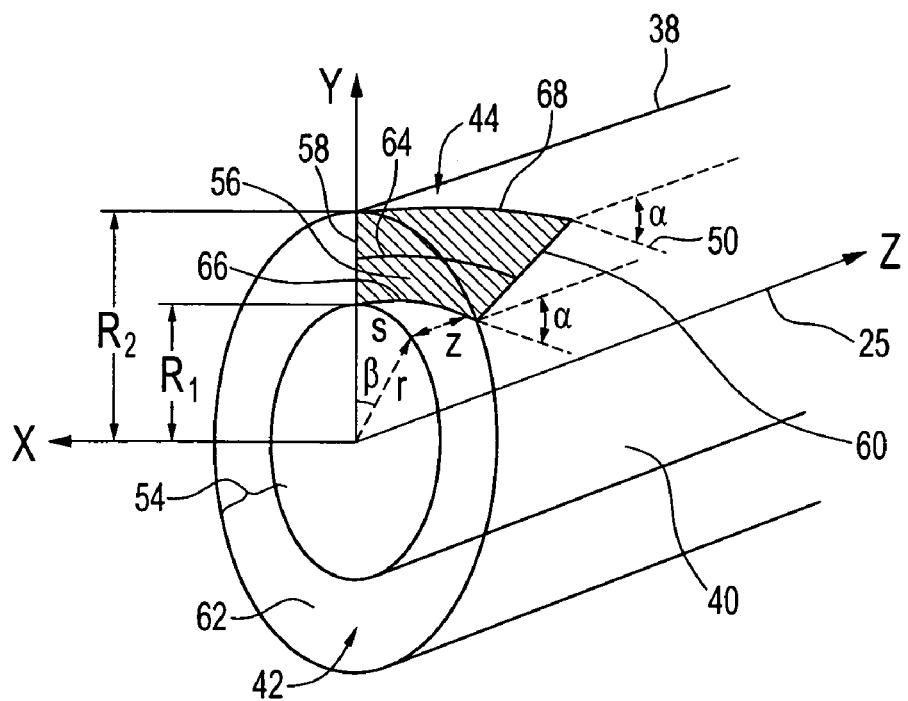
FIG. 2 is a schematic perspective view of an inlet vane shaped according to a preferred embodiment of the present invention.
Figure 3A:
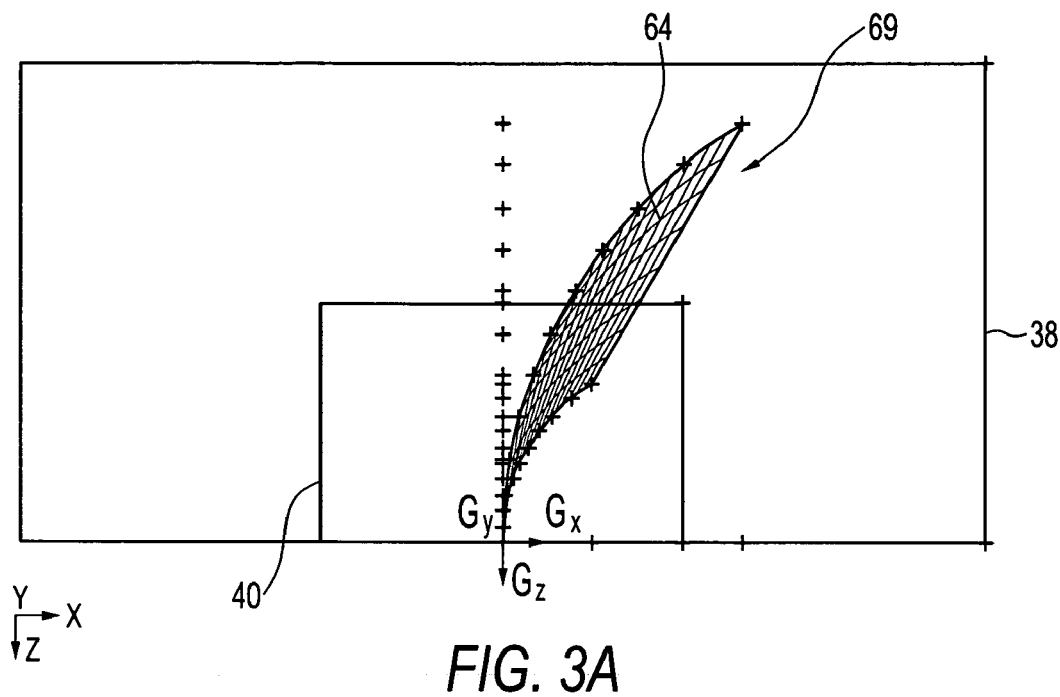
FIGS. 3A–3D are three-dimensional grid meshes of an exemplary inlet vane shaped according to a preferred embodiment of the present invention.
Figure 3B:
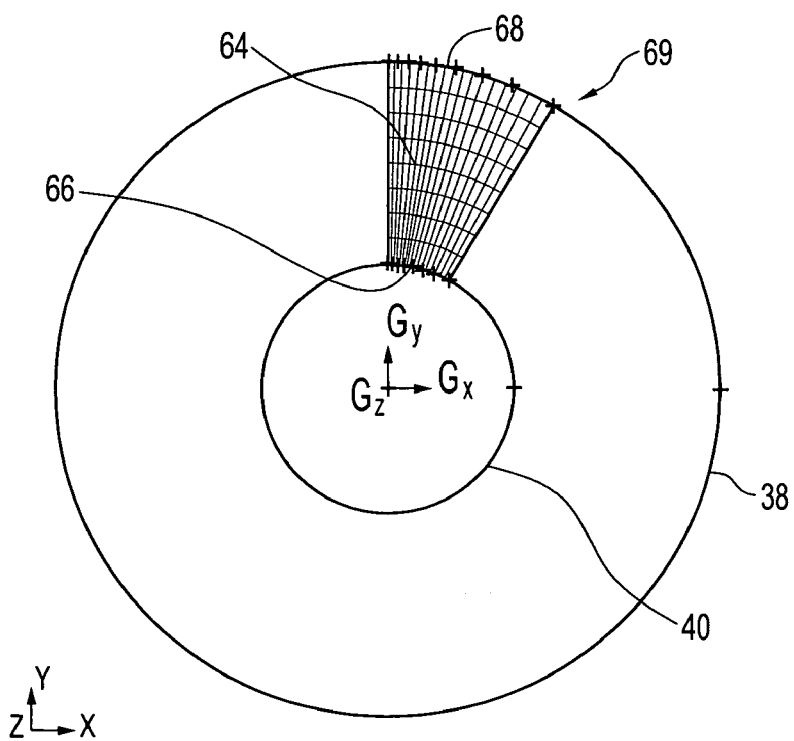
Figure 3C:
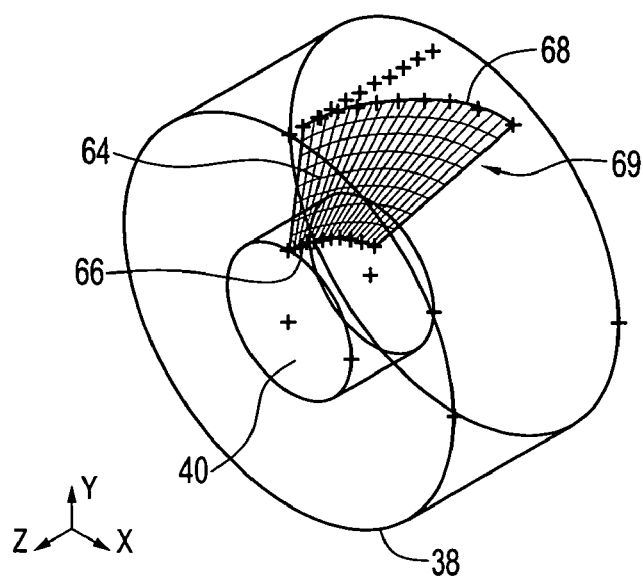
Figure 3D:
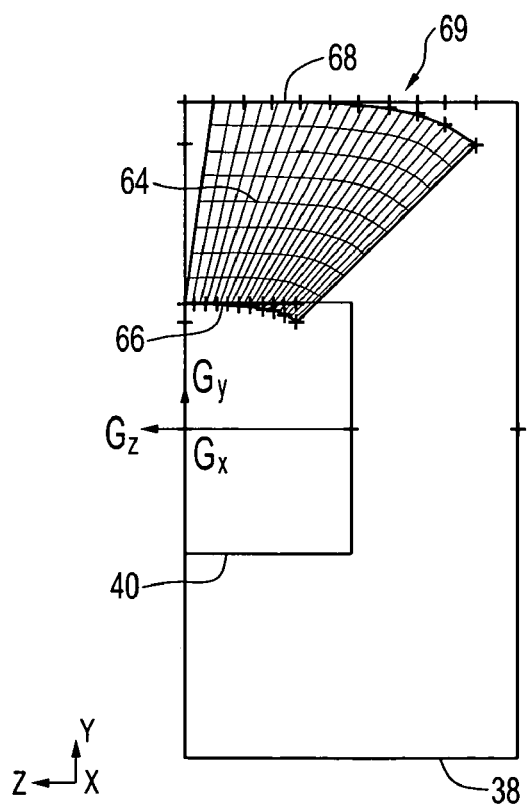

Thus, to improve efficiency and cutsize of a particle separation device, it is desirable to minimize turbulence and flow resistance of the fluid 24 as it enters a spiral flow through the annular tunnel 42. According to an aspect of the present invention, to reduce turbulence and flow resistance, the inlet vanes 44 are arced so that the flow of the fluid 24 along any point of a surface 56 of each vane is in an arced motion, thus minimizing the resistance and turbulence intensity. FIG. 2 shows the inlet vane 44 shaped according to a preferred embodiment of the present invention.

While straight, flat vanes impart a spiral motion by deflecting the fluid stream from an initial axial flow, they introduce turbulence and increase the flow resistance. Using the arced inlet vanes 44 of the present invention, by contrast, the traveling fluid 24 is deflected from axial flow in an arced path from an entrance 58 of the vanes to an exit 60, where the fluid is discharged from the vanes. This effect reduces turbulence and flow resistance, and thus increases efficiency and allows smaller cutsizes.

As shown in FIG. 2, the inlet vane 44 is arced so that a deflection angle of the fluid 24 (the angle between the tangential direction of the inlet vane surface 56 and the axial direction 25) as it passes along the inlet vane gradually varies from an initial angle at the entrance 58 with respect to the axial direction 25 at or near 0° (that is, parallel to the axial direction), to the discharge angle α as it exits the inlet vanes at the exit 60. Due to the arced shape of the inlet vane 44, this gradual angle variation is substantially smooth (and preferably is made as smooth as possible), so that the fluid 24 at any point along the surface 56 of the inlet vane follows an arced path from the entrance 58 to the exit 60. By contrast, in a perfectly straight vane design, the deflection angle of entering fluid 24 with respect to the axial direction 25 is constant from the entrance to the exit (discharge).

A description of an exemplary contour of the surface 56 of the inlet vane 44 follows, with reference to FIG. 2. In this example, the cylindrical coordinate system (r, β, z) is applied. In the equations below, $R_1$ and $R_2$ are the radii of the inner member 40 and outer cylinder 38 respectively (and thus the inner and outer radii of the annular tunnel 42). The exit angle α, which may vary as described above, is the discharge angle at the exit 60 of the inlet vane 44, between the tangential direction 50 of the vane and the z-axis direction (axial direction 25). Angle β is the angle α projected on the x-y plane (i.e., the front view of the discharging angle), in degrees. Distance z equals the axial distance between the front edge of the x-y plane circle 62 and a contour curve 64 of the inlet vane 44 on the same annulus. Distance r is equal to a radial position of a point on the inlet vane 44 from the front view (i.e., on the x-y plane 62) ($R_1 \leq r \leq R_2$).

Given the exit angle α of the inlet vane 44 (0°<α<90°) as a design parameter, the relationship between the maximum value of β and α is defined as $$\beta_{max} = 90° - \alpha \qquad (1)$$

To define points on the contour 64 of the exemplary inlet vane 44, for an arbitrary angle β and an arbitrary radius r, the arc length, s, swept by the radius r on the x-y plane is $$s = \frac{\pi}{180} \beta r \qquad (2)$$

The corresponding z coordinate with the arbitrary r and β is $$z = \sqrt{r^2 - (r-s)^2} = \sqrt{2rs - s^2} \qquad (3)$$
$$= r\sqrt{\frac{\pi}{90}\beta - \left(\frac{\pi}{180}\beta\right)^2}$$

In this way, for any point of the exemplary inlet vane 44, $$s = r \pm \sqrt{r^2 - z^2} \qquad (4)$$

Thus by varying r and β, and determining z for a given set of r and β, points on the contour 64 of the inlet vane 44 can be determined. Inlet vanes 44 designed substantially according to these equations allow a substantially smooth, arced flow of the fluid 24 passing through the inlet vanes to minimize turbulence intensity and flow resistance. In an exemplary inlet vane design process, given a radius $R_1$ of the inner member 40, a radius $R_2$ of the outer cylinder 38, and an inlet vane discharge angle α, the following steps are used to generate the entire contour of the surface 56 of the exemplary inlet vane 44 in a three-dimensional domain using the above equations:

1. Starting with r=R$_1$ and varying β from 0° to (90°−α) by an increment Δβ, generate an array of z values (when β=0, z=0) using Equation (3) above to generate a series of grid points together forming a contour curve 66 of the inlet vane 44 intersecting with the inner member 40.

2. Increase r by an increment of Δr, and, again varying β from 0° to (90°−α) by increment Δβ, generate a series of grid points together forming a contour of the inlet vane 44 with a radius of r+Δr, such as the contour 64.

3. Repeat Step 2, each time gradually incrementing the previous r by Δr, until r=R$_2$. This completes the entire contour of the exemplary inlet vane 44. The outer contour 68 of the inlet vane 44, when r=R$_2$, is an intersection of the vane and the outer cylinder 38, as shown in FIG. 2.

The grid points may be generated in a three-dimensional domain by any suitable method, for example, a spreadsheet computer program. FIGS. 3A–3D show inlet vane contours 64 along the x-z plane (FIG. 3A), in perspective (FIG. 3C), along the x-y plane (FIG. 3B), and in the y-z plane (FIG. 3D), formed as a mesh 69 of the grid points. The smoothness of the contour 64 of the exemplary inlet vane 44 is determined by Δr and Δβ; i.e., a smaller Δr and Δβ results in a smoother contour.

Figure 4A:
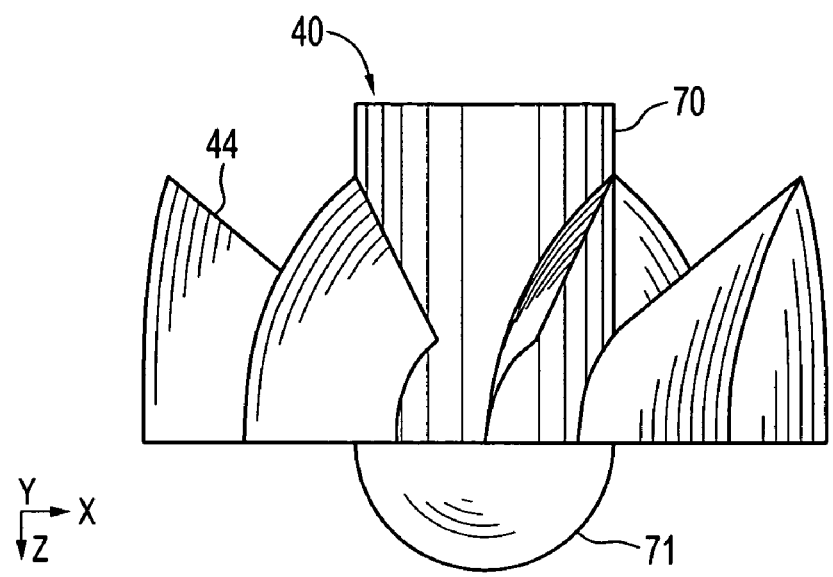
FIGS. 4A–4D are three-dimensional profiles of a plurality of vanes and an inner member according to an embodiment of the present invention.
Figure 4B:
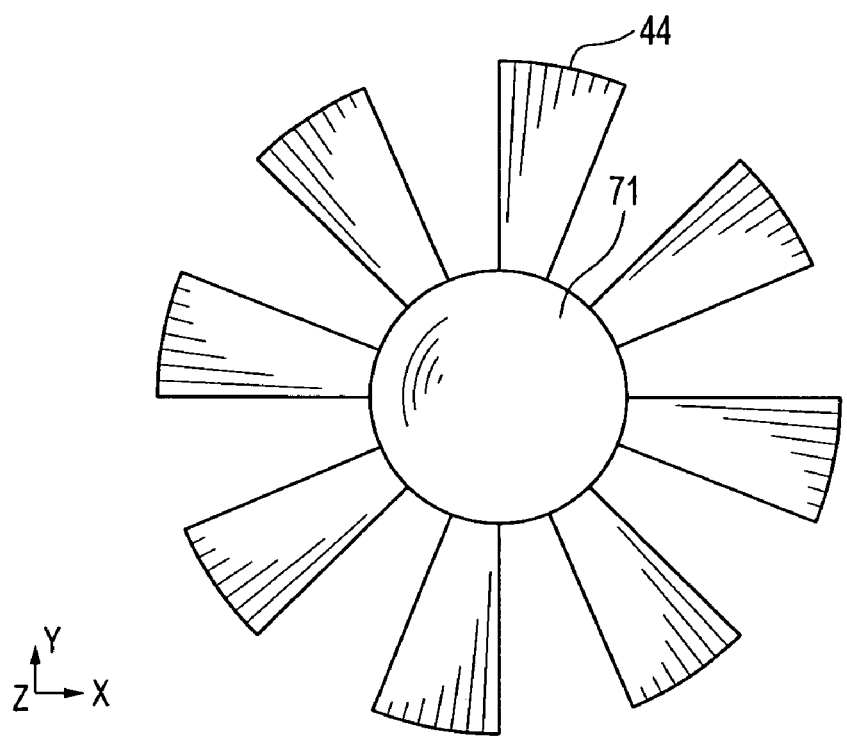
Figure 4C:
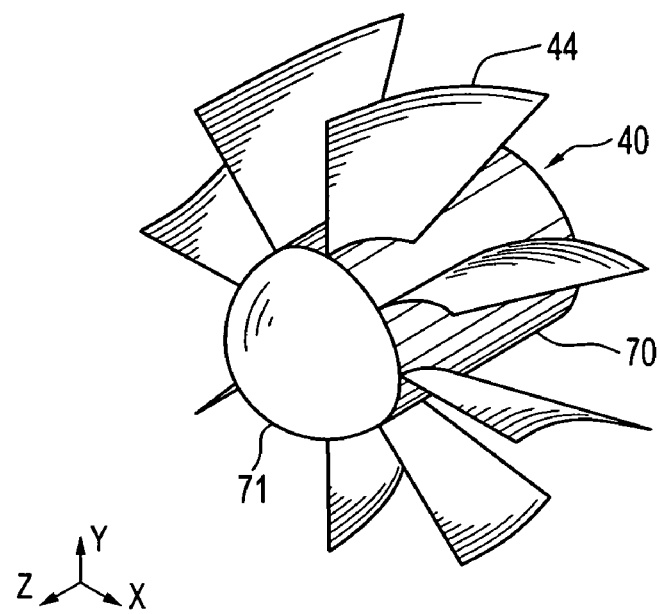
Figure 4D:
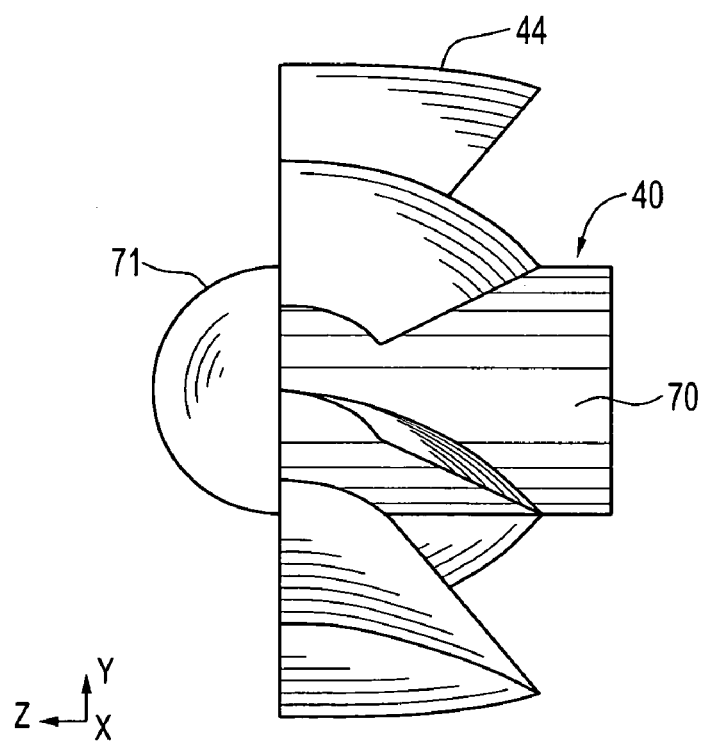

Given the grid points forming the grid mesh 69 in the three-dimensional domain for a plurality of inlet vanes 44, preferably symmetrically disposed about the annular tunnel, a three-dimensional profile is generated from the grid mesh. For example, a suitable computer machining software program may be used, such as, but not limited to, AutoCAD or ProE. FIGS. 4A–4D show eight inlet vanes 44 disposed about the inner member 40, along the x-z plane (FIG. 4A), in perspective (FIG. 4C), along the x-y plane (FIG. 4B), and along the y-z plane (FIG. 4D). Additional inlet vanes can be designed in the same manner as the exemplary inlet vane 44 above, where the edge at the entrance 58 of each inlet vane preferably is offset from an adjacent inlet vane through rotation about the z-axis with an angle of (360°/(total number of inlet vanes)). The inlet vanes 44 may be formed separately or integrally with the inner member 40.

Figure 5A:
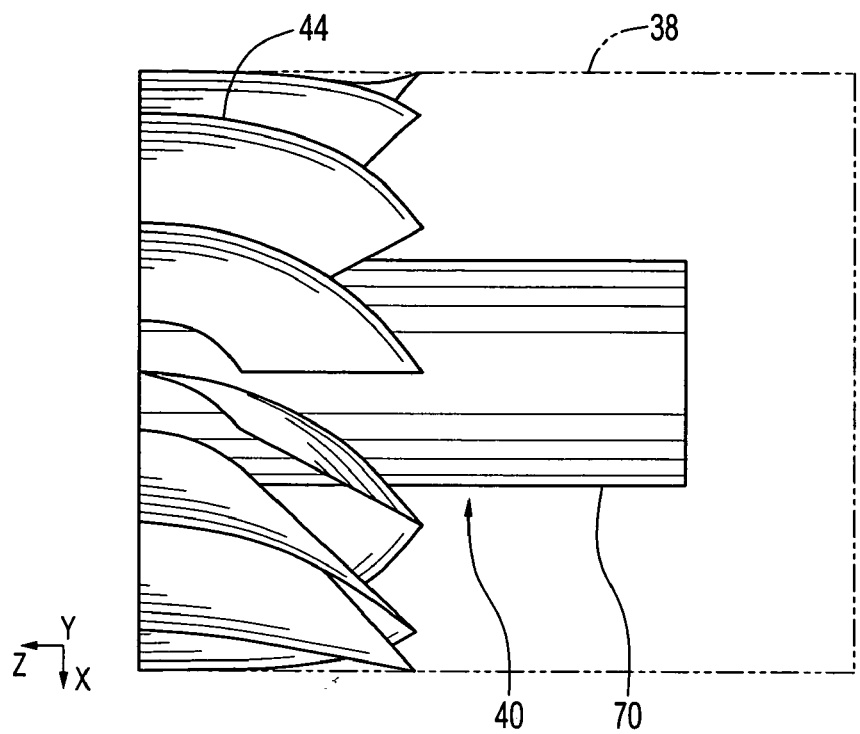
FIGS. 5A–5D are three-dimensional profiles of an inner member and inlet vanes according to an embodiment of the present invention.
Figure 5B:
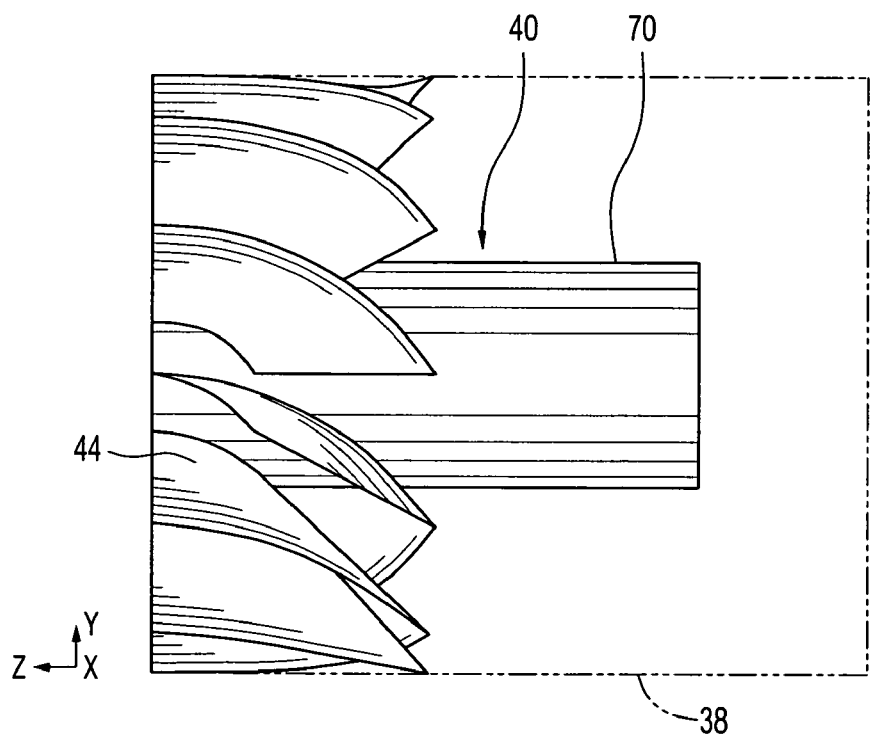
Figure 5C:
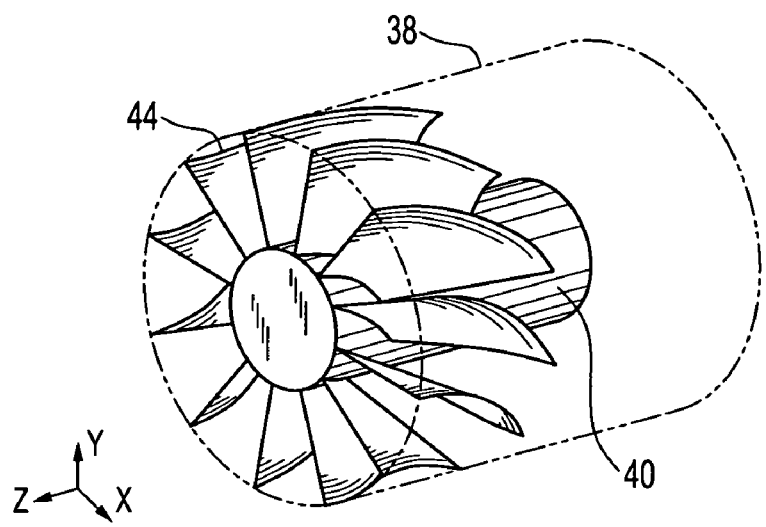
Figure 5D:
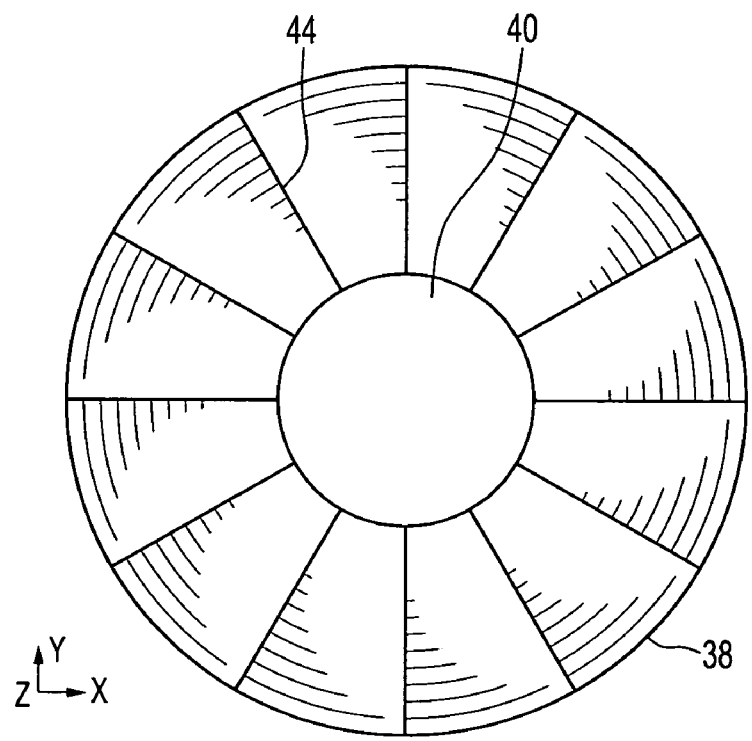

As stated above, the distance between the inlet vanes 44 preferably should not exceed the gap between the inner member 40 and the outer cylinder 38. To reduce turbulence further, the inlet vanes 44 can be arranged around the circumference of the annular tunnel 42 so that, when viewed from the front (x-y) plane, they appear to meet or overlap. In a preferred arrangement, the inlet vanes 44 overlap and are arranged such that the edge at the exit 60 of the inlet vane is at or substantially near the same angular location along the x-y plane 62 (that is, the same position along the circumference of the annular tunnel) as the entrance 58 of a next inlet vane along the circumference of the annular tunnel, and so on. In this way, when viewed from the x-y plane, the entire area of the annular tunnel 42 appears filled by the set of inlet vanes 44. Profiles of a set of twelve inlet vanes 44 are shown in FIGS. 5A–5D. FIG. 5D (x-y plane) illustrates the full circle of vanes 44.

The inner member 40 may have a cylindrical portion or section 70 and may terminate at either end in non-cylindrical portions or sections for guiding the fluid 24 more efficiently into and through the particle separation device 20. As shown in FIGS. 4A–4D, a front nose 71 is disposed at a front axial end of the inner member 40, upstream of the inlet vanes 44. The nose 71 shown in FIGS. 4A–4D has an ellipsoidal shape for reducing turbulence of the fluid 24 entering the separation chamber.

Figure 6A:
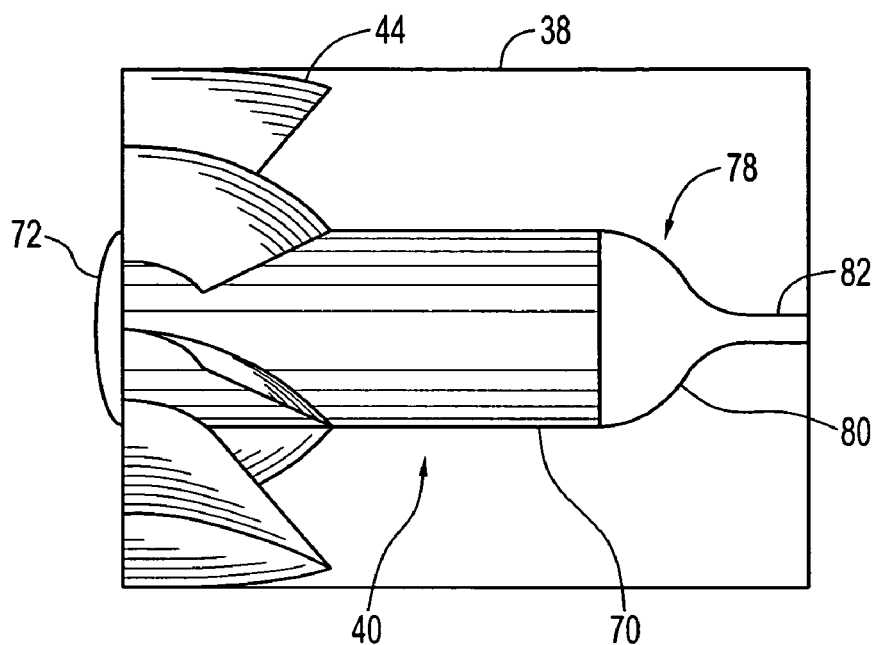
FIGS. 6A–6B show alternative nose shapes and exit nozzles for an inner member.
Figure 6B:
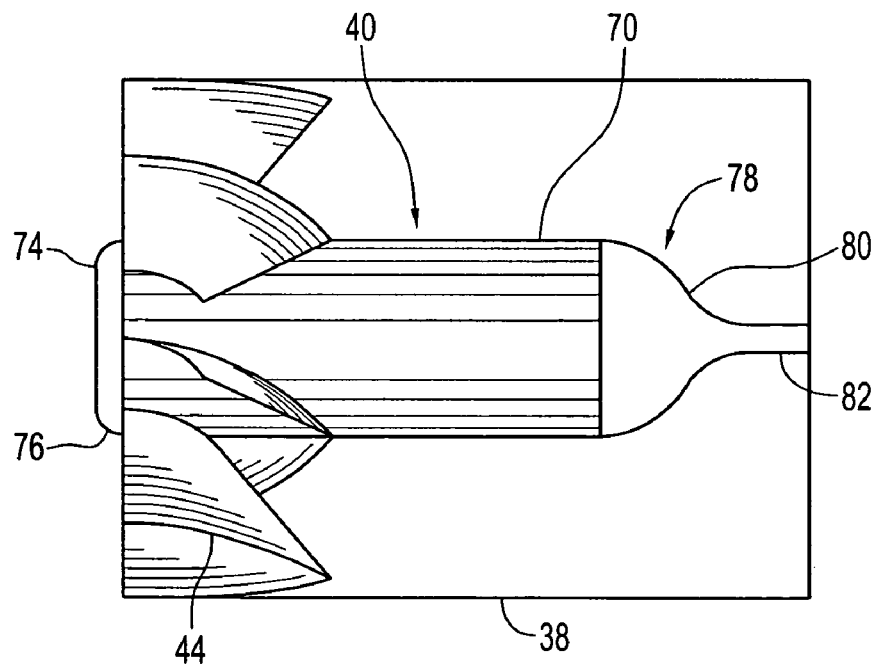

FIGS. 6A and 6B show alternative noses 72 and 74, respectively, at a front end of the inner member 40, which may be formed separately or integrally with the inner member. Nose 72 has a generally ellipsoidal shape, though it is flatter than the nose 71. Nose 74 has a flatter profile than nose 72, but still includes rounded edges 76. Other noses may be used as well to minimize or reduce turbulent flow. The particle separation device 20 may instead be formed without a nose. The inner member 40, and nose if any, may be generated together with the inlet vanes 44 (for example, as an integral piece) for design and fabrication purposes, for example.

As also shown in FIGS. 6A and 6B, a rear nozzle 78 is disposed at a back axial end of the inner member 40 and extends axially toward the outlet 32. It is possible, however, for the particle separation device 20 to omit the rear nozzle. The nozzle 78 may be separately or integrally formed with the remainder of the inner member 40. The nozzle 78 at the back end of the inner member 40 preferably is defined by the cylinder 70 terminating in a substantially hemispherical portion 80 that leads smoothly into a smaller cylinder 82, defining a larger open area of the separation chamber 26 leading toward the outlet 32. The nozzle 78 accordingly has a preferred shape somewhat similar to a wineglass. Alternatively, the nozzle 78 may lead to a tip 84, as shown in FIG. 9B. The inner member 40 may terminate short of the outlet 32 to create an open cylindrical portion of the separation chamber 26 extending axially from the end of the inner member to the outlet.

Referring again to FIG. 1, the outlet 32 preferably has an open area equal to an area A$_{op}$ of the annular tunnel 42. A preferred rear outlet radius R$_r$ may be calculated by the following general equation:

$$R_r = \sqrt{\frac{A_{op}}{\pi}} = \sqrt{R_2^2 - R_1^2}$$

For an inner member 40 radius of 38 mm and an outer cylinder 38 radius of 100 mm, for example, the preferred rear outlet radius R$_r$=92.5 mm.

Figure 7A:
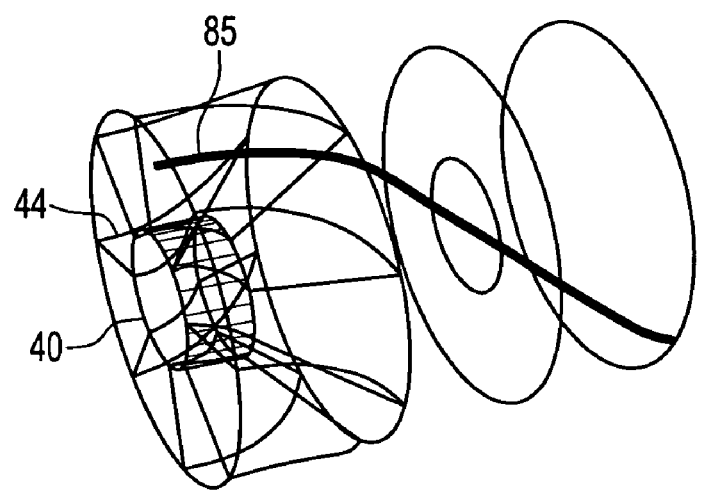
FIGS. 7A and 7B show a track of a single particle and a plurality of particles, respectively, moving through a particle separation device according to an embodiment of the present invention.
Figure 7B:
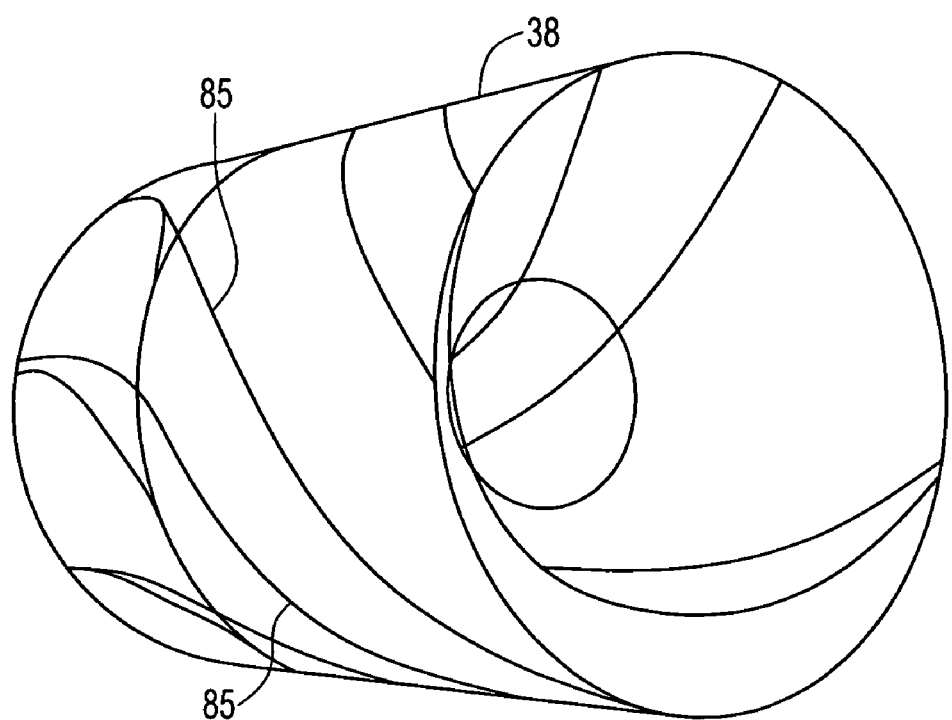

FIGS. 7A and 7B show a computerized model of a path 85 of a particle and a number of particles, respectively, introduced into the above-described inlet vanes 44 and the annular tunnel 42 (without an exit shown). The particles 22 accelerate after leaving the inlet vanes 44, and slow down as they travel through the remainder of the separation chamber 26 due to drag force and friction. As best seen in FIG. 7A, a particle (for example, dust) reaches the inner surface of the outer cylinder 38 of the particle separation chamber 26 at or before the axial end of the particle separation chamber. The particles 32 can thus be collected by the collection apparatus 34. Preferably, the collection apparatus 34 is connected to this radially outer region.

Individual particle separation devices such as the device 20 shown in FIG. 1 may require a significant amount of pressure drop and thus significant power to operate. Furthermore, an individual particle separation device 20 may have an axial length that is too large for use in particular environments. According to another aspect of the present invention, an array of individual particle separators may be combined into a separation system 86, as shown by example in FIG. 8. A large separator size with smaller axial length can be accommodated by the multiple separator array configuration.

Figure 8:
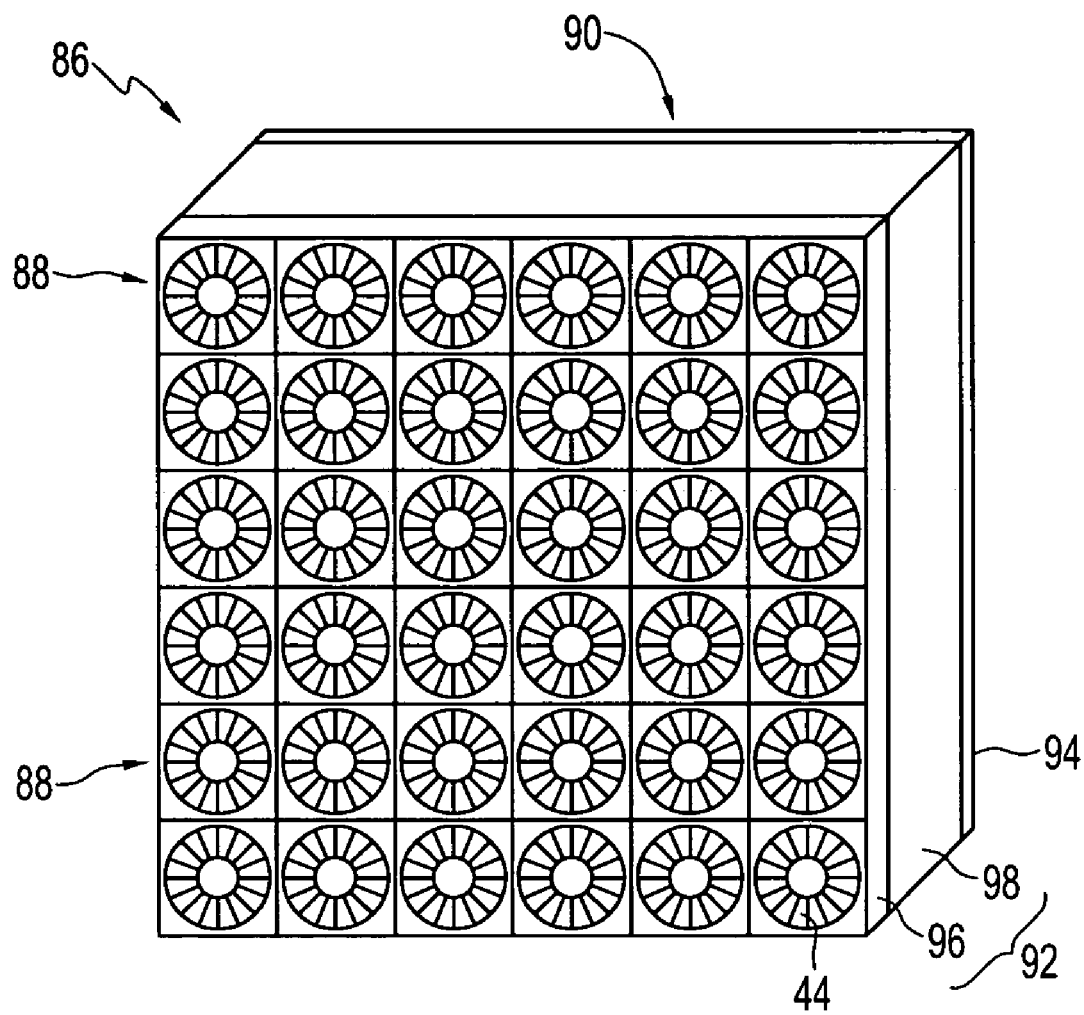
FIG. 8 shows a particle separation system having an array of particle separation modules, according to another embodiment of the present invention.

As shown in FIG. 8, the separation system 86 includes a plurality of substantially cylindrical particle separation modules 88 that are stacked or otherwise arranged in an array, that is, a group of individual particle separation modules that collectively provide particle separation for the system. The individual modules 88 are preferably disposed within a casing 90 for supporting or holding the modules. Using a plurality of particle separation modules reduces the required axial length of each individual particle separator module 88 within the system 86, while allowing significantly uniform fluid flow across the area created by the array. The separation system 86 is preferably disposed in a position within an environment to accept fluid and to introduce fluid with particles removed into an area desired to be freer of particles. The array in the separation system 86 is exemplary, and other arrangements of multiple particle separation modules 88 may be used. The modules 88 may be arranged in aligned rows and/or columns or staggered rows or columns, and rows or columns may be complete or incomplete.

The casing 90 of the exemplary system 86 shown includes a plurality of axially separable sections 92, 94 that may be connected by hinging or clamping the sections together. The components for particle separation are housed within the sections 92, 94 of the casing 90. The first section 92, for example, may include the cylindrical separation chamber 26 and inlet 28 of each module 88, while the second section 94 may include an outlet and a collection apparatus.

For fabrication purposes, the section 92 may also be divided into separate sections 96, 98, which may be connected by hinging, clamping, or fastening. For example, as shown in FIG. 9B, the inner member 40 and inlet vanes 44 are preferably formed as a single piece (for example, as described and shown above), and fitted within a front part of the outer cylinder 38 housed within the section 96 of the casing 90. The remainder of the separation chamber 26 (the remainder of the outer cylinder 38) is housed within the section 98. To form the section 92, the sections 96, 98 are joined together so that the front part of the outer cylinder 38 is aligned with the remainder of the outer cylinder in section 98 (as shown in FIG. 9B), and the sections may be connected using bolts or clamps (not shown), e.g. When the sections 96, 98 are joined, the inner member 40 extends into the section 98.

Figure 9A:
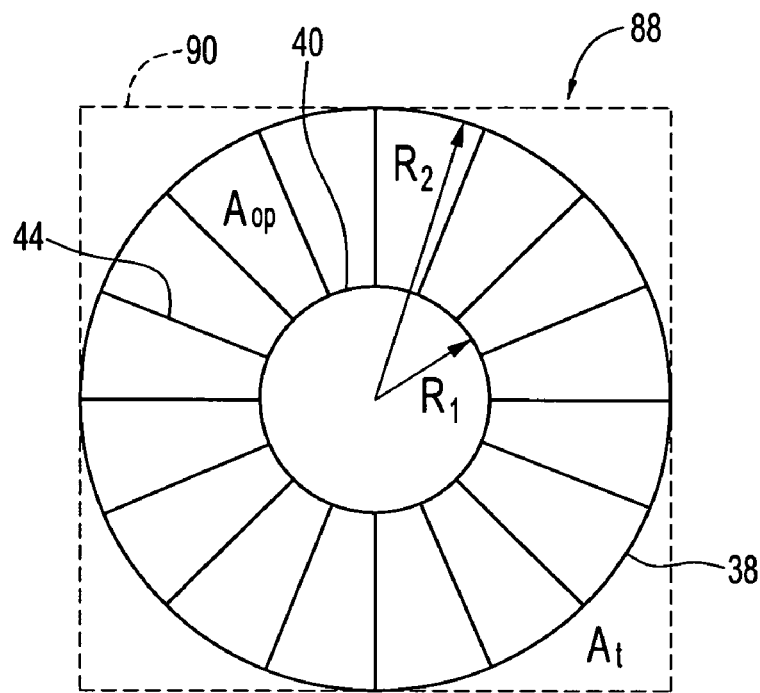
FIGS. 9A and 9B show front and sectional views, respectively, of individual single annular particle separation modules according to an embodiment of the present invention.
Figure 9B:
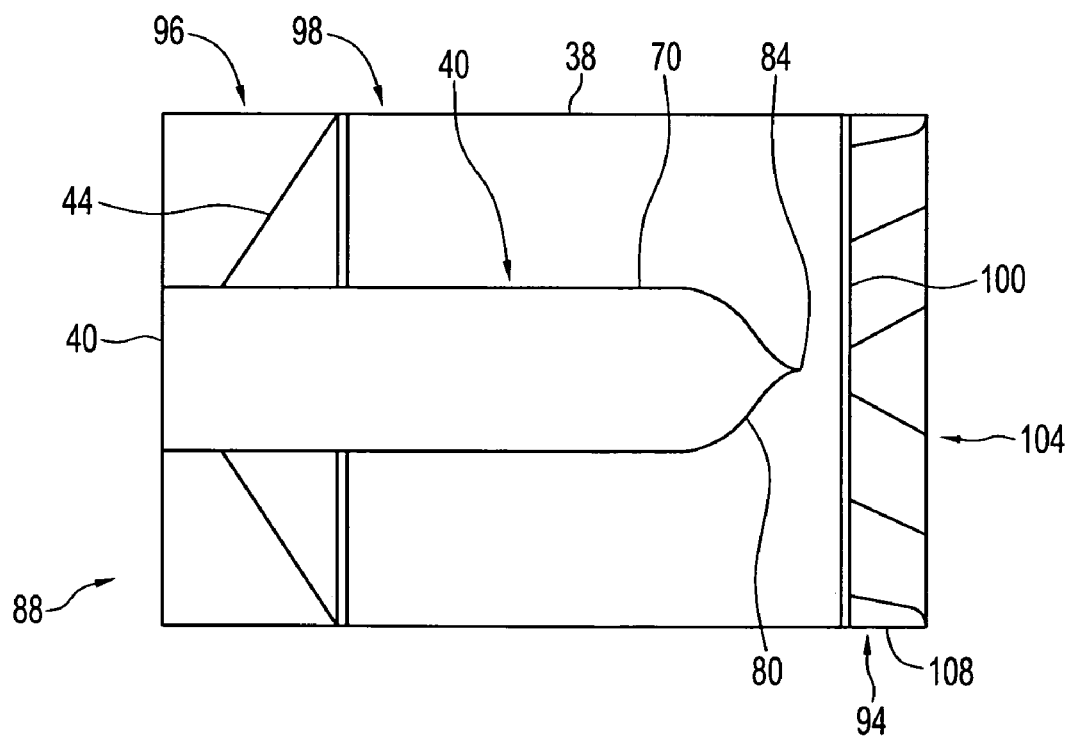

FIGS. 9A and 9B show a front view of a single module 88 in front view and in section, respectively. The portion of the casing 90 housing the module 88 is shown in dashed lines. As shown in FIG. 9B, the module 88 includes the inner member 40 (shown without a nose, but with the tip 84), inlet vanes 44, and outer cylinder 38, which is preferably separable, as explained above.

Figure 10:
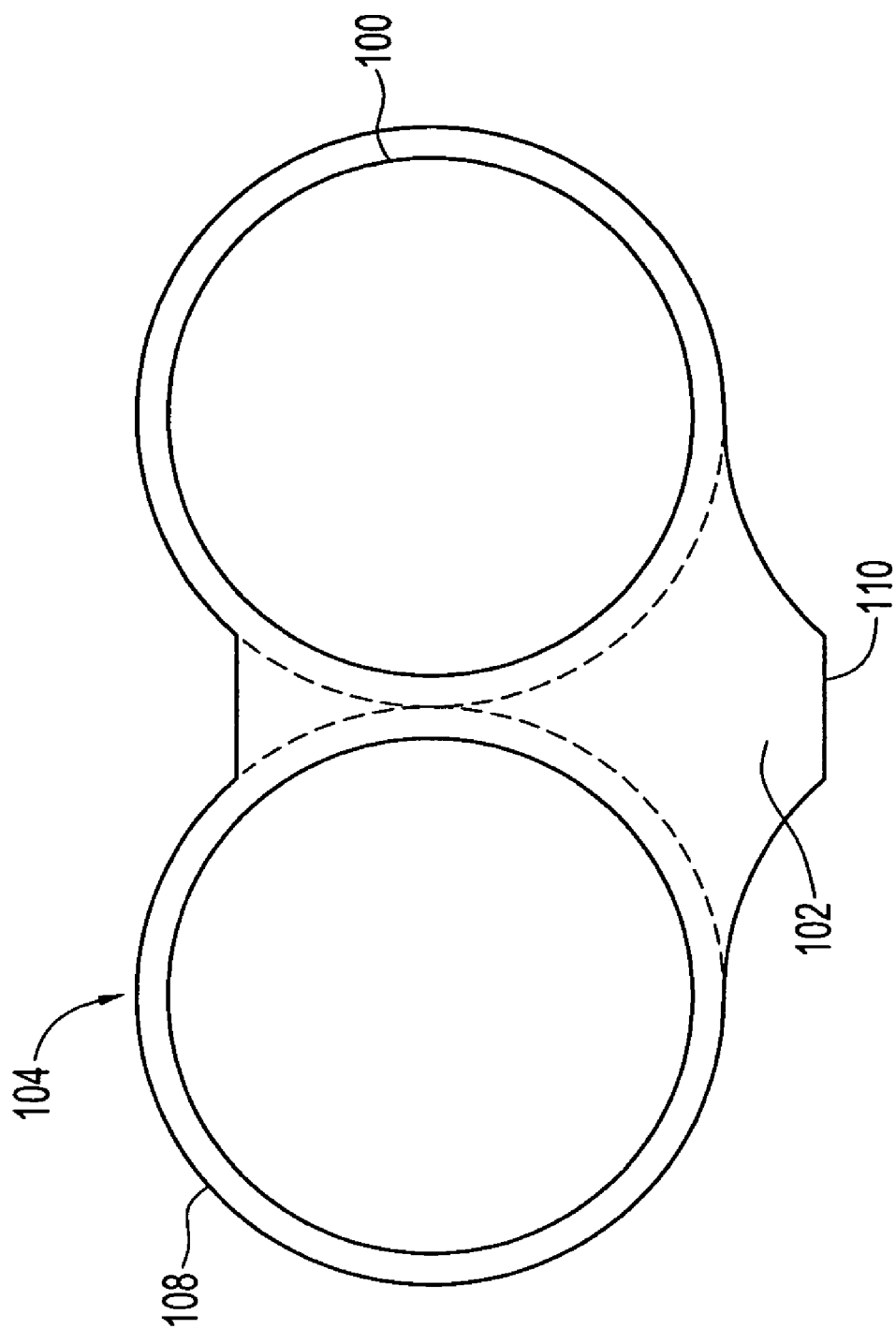
FIG. 10 shows a bunker outlet for a pair of particle separation modules according to a preferred embodiment of the present invention.

The module 88 is connected to a cylindrical fluid outlet 100 for exiting of the fluid 24 from the module after removal of a plurality of the particles 22. As shown in FIGS. 9B and 10, the fluid outlet 100 may be combined with a collection bunker 102 that is in communication with a pair of the modules 88 to form a bunker outlet 104, which is formed into casing section 94. Referring to FIG. 10, the bunker outlet 104 includes a pair of adjacent (but not touching) fluid outlets 100. The fluid outlets 100 may, but need not, include exit vanes.

As also shown in FIG. 9B, the fluid outlets 100 are disposed within the bunker outlet 104 so that a collection cylinder 108 of the collection bunker 102 is provided between the fluid outlet 100 and the outer cylinder 38 of the module 88. The collection cylinder 108 is concentric with the fluid outlets 100 but has a greater diameter, thus surrounding the fluid outlets (best seen in FIG. 10). The outer cylinder 38 of each of the pair of modules 88 is aligned with the collection cylinder 108 of a respective collection bunker 102. In this way, the particles 22 move outwardly in a radial direction within the outer cylinder 38 of the module 88 during operation of the particle separation system 86, and do not pass through either fluid outlet 100, but instead enter the collection cylinder 108 of the collection bunker 102. The collection cylinder 108 of each collection bunker 102 feeds into a chute 110 of the bunker outlet 104 for collection of the particles 22 from each pair of modules 88.

Figure 12:
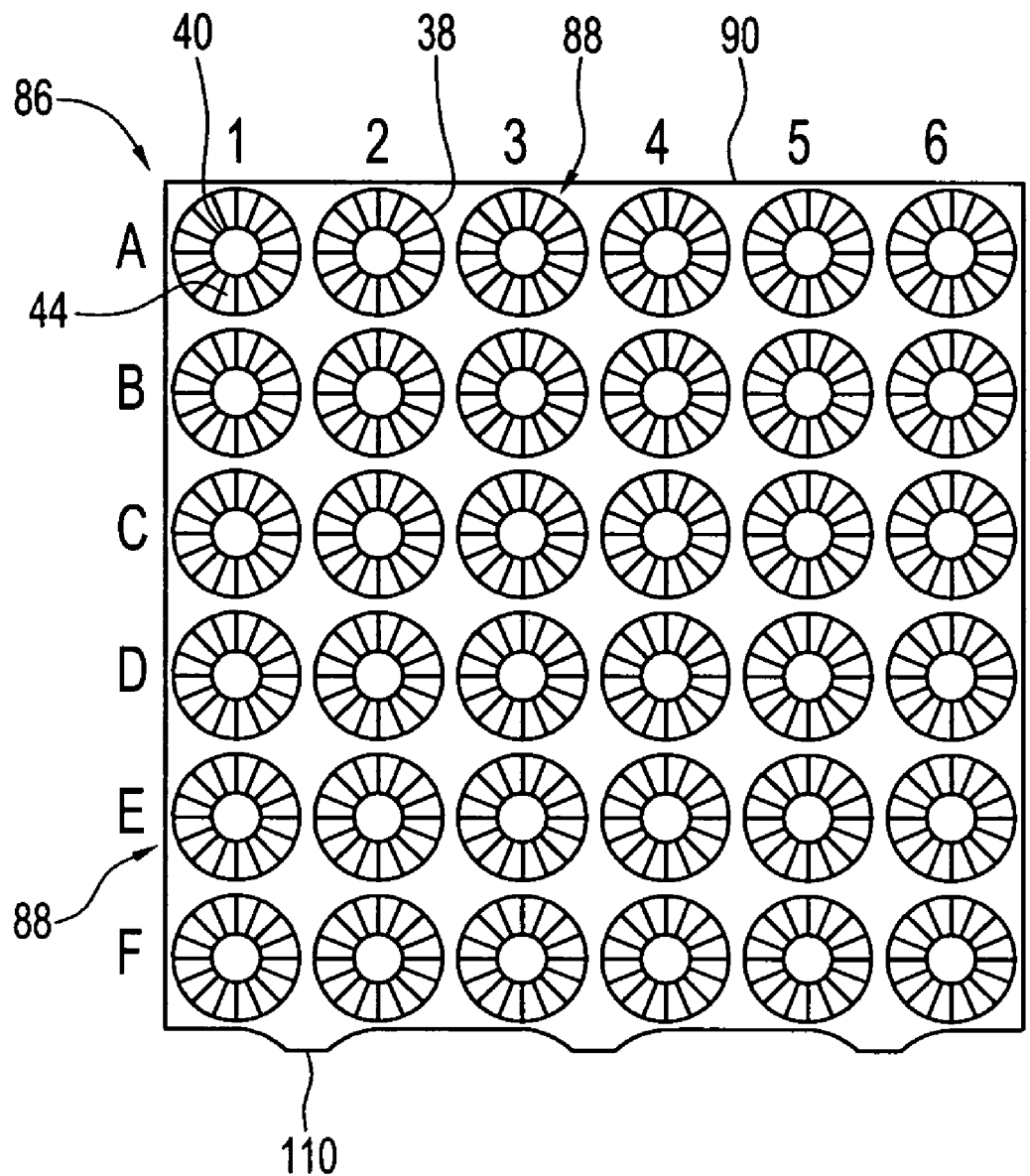
FIG. 12 shows a 6×6 array of particle separation modules according to another embodiment of the present invention.

FIGS. 11A and 11B show a 2×6 array of modules 88 and a bunker outlet 104 for the modules, respectively. As shown, for each pair of modules 88, the fluid 24 passes through the module 88 and through the fluid outlet 100, while the particles 22 enter the collection cylinder 108. From there, the particles 22 enter a hopper 112 having angled sides 114 for directing the fluid through an exit hole 116. The exit holes 116 for each pair of modules 88 are connected to a manifold 118, which itself may be connected to a main manifold (not shown). The bottom chute 110 may also be connected to the main manifold. FIG. 12 shows a 6×6 array of modules 88.

Figure 13:
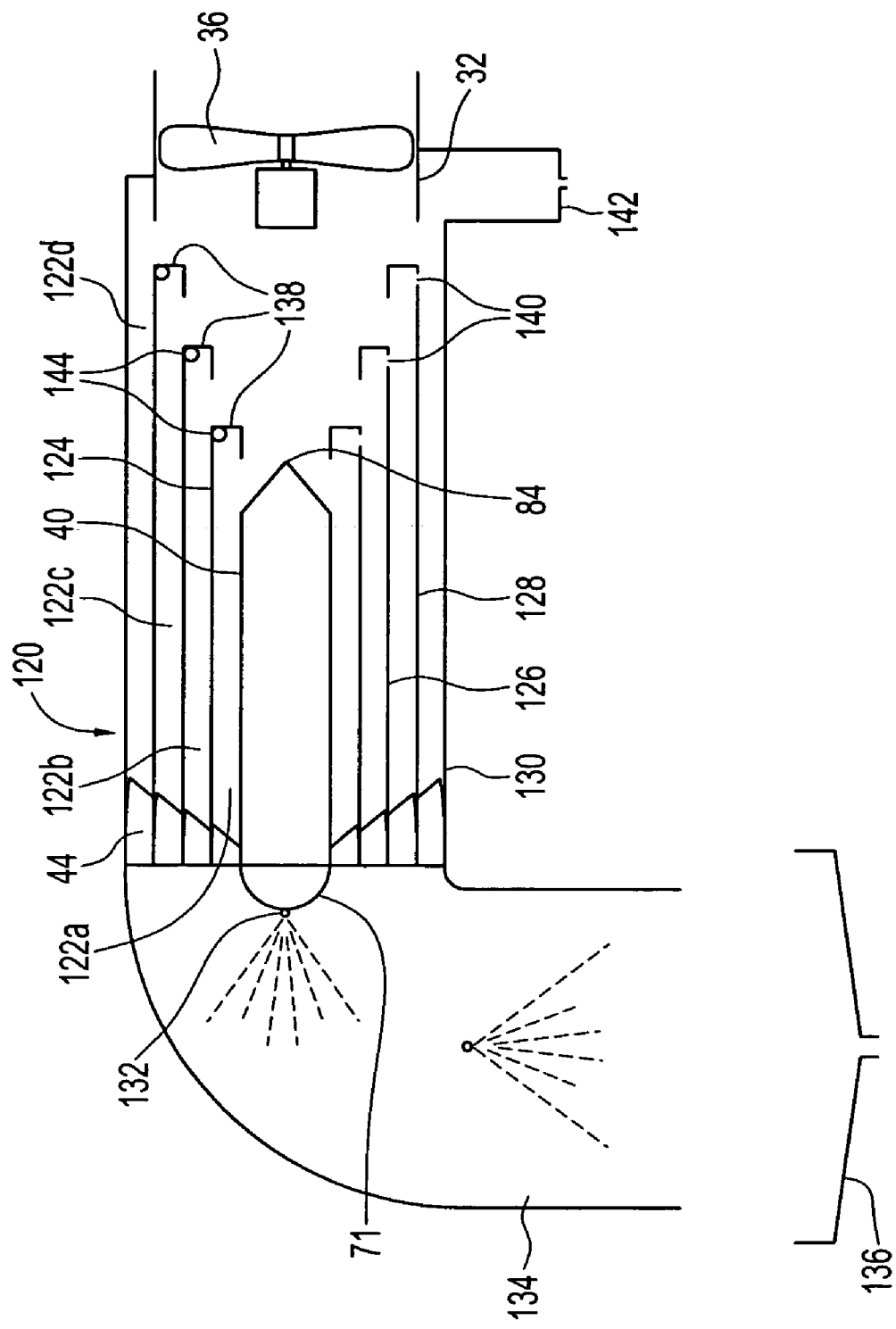
FIG. 13 is a sectional view of a multi-annular particle separation apparatus according to a preferred embodiment of the present invention.

As an alternative embodiment to the single-annular module shown in FIGS. 8–12, a multi-annular module 120 may be used, as shown by example in FIG. 13. For a large cylindrical dimensional requirement, the multi-annular module 120 is helpful to keep the distance between the inner member and outer cylinder of each module from getting too large. The multi-annular module 120 of FIG. 13, which, for example, may be fitted within an overall particle collection system with or without other modules, includes a plurality of concentric particle separation devices 122a–122d. As shown in FIG. 13, for example, the concentric particle separation devices 122a–122d are defined by inner member 40 and concentric cylinders 124, 126, 128, and 130. Specifically, the inner member 40 and concentric cylinder 124 form device 122a; i.e., the concentric cylinder 124 forms the outer cylinder of device 122a. The concentric cylinder 124 also provides an inner cylinder of device 122b, which also includes concentric cylinder 126. Similarly, device 122c includes concentric cylinders 126 and 128 as inner and outer cylinders respectively, and device 122d includes concentric cylinders 128 and 130 as inner and outer cylinders.

To improve collection of the particles 22, the exemplary multi-annular module 120 includes a misting nozzle 132 disposed at the nose 71 of the inner cylinder, and within an inlet guide chute 134 of the module. By misting the entering fluid 24 with water, for example, the particles 22 more easily separate from the individual devices 122a–122d while limiting reentrainment into the fluid. A catch basin 136 is provided to collect water applied at the nose 71 and within the inlet guide chute 152. The fluid pressure generator 36 is disposed at the outlet 32 of the module 120.

An inside annular groove 138 is located at an axial end of each of the concentric cylinders 124, 126, and 128 to prevent reentrainment of separated particles 22 from fluid 24 entering the outlet 32. A drain hole 140 is provided in the concentric cylinders 124, 126, 128 near the inside annular groove 138 for carrying particles from inner devices 122a, 122b, 122c to the concentric cylinder 130. Concentric cylinder 130, forming the outer cylinder of the module 120, includes a chute 142 for particle/water collection from each of the devices 122a, 122b, 122c, 122d. Flush nozzles 144 are provided at or near each inside annular groove 138 for wetting separated particles as they flow towards an inner surface of a respective outer cylinder to minimize likelihood of their reentrainment.

Figure 14:
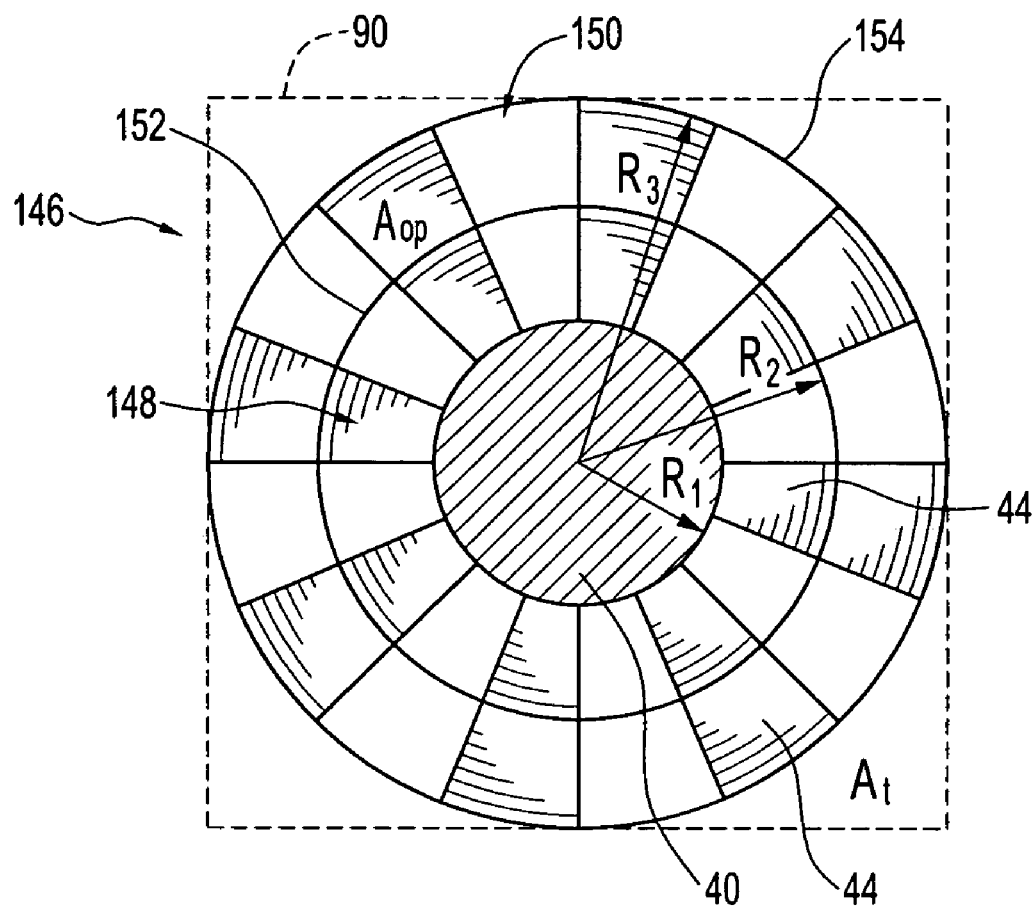
FIG. 14 is a front view of a multi-annular particle separation apparatus having inner and outer concentric separation devices.

FIG. 14 shows a multi-annular module 146 including a pair of concentric particle separation devices 148, 150. As shown, the inner member 40 has a radius $R_1$, a concentric cylinder 152 forming the outer cylinder of the inner device 148 and the inner cylinder of the device 150 has a radius $R_2$, and another concentric cylinder 154 forming the outer cylinder of the device 150 has a radius $R_3$. Use of the concentric cylinders 152, 154 preferably increases the opening area within the module 146 and increases particle separation efficiency. To form the exemplary inlet vanes 44 for the inner device 148, radii $R_1$ and $R_2$ are used in the process for upper and lower limits, while for the outer device 150, radii $R_2$ and $R_3$ are used.

Particle separation devices preferably may be used in a variety of environments. As one example, large engines on off-road vehicles such as combines, forage harvesters, and tractors require large cooling systems, which are directly exposed to dusty environments. Particles including dusts, fine crop residues, and insects enter the cooling air streams, causing clogging of fins on radiators, and reducing cooling efficiency of engines. Fin spacing on these existing cooling systems is typically 4–5 fins per inch to allow pass-through of large particles, and thus operators must cope with accumulation of particles on the fins. As a result, radiators require periodic cleaning having various ranges. Cooling efficiency reduces a significant amount near a cleaning time, and in certain circumstances, may cause overheating of engines. To meet the cooling requirement, radiators and the cooling fan have to be large, leading to high cost, high power consumption, high weight, and difficulties in fitting into a given vehicle space. Existing cooling fans, for example, consume approximately 10–15% of the engine power on a typical combine.

A twin module particle separation system 160 according to an embodiment of the present invention is used as an add-on to an existing cooling system to improve cooling efficiency and reduce the maintenance requirement. The twin module particle separation system 160 can be configured for desired flow rates, maximum axial length (to fit into an existing configuration, for example), and within a particular pressure drop across the device to meet a particular maximum amount of power consumption.

Figure 15A:
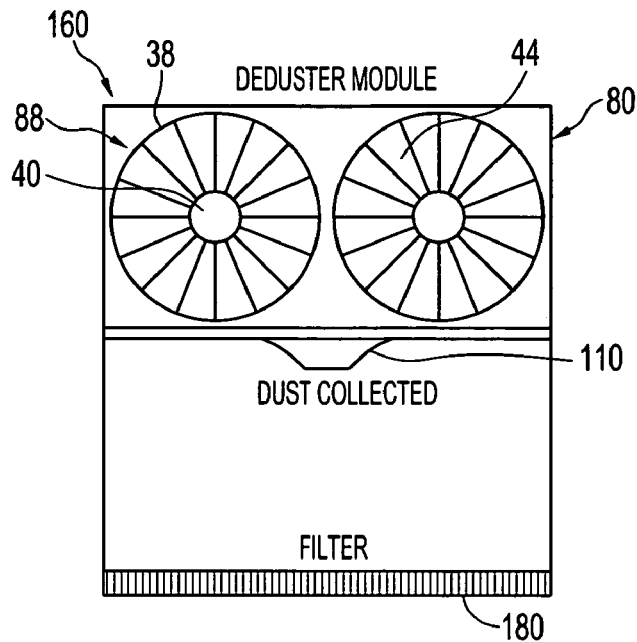
FIGS. 15A–15B are front and sectional views, respectively, of a particle separation device for cleaning air entering an engine according to a preferred embodiment of the present invention.
Figure 15B:
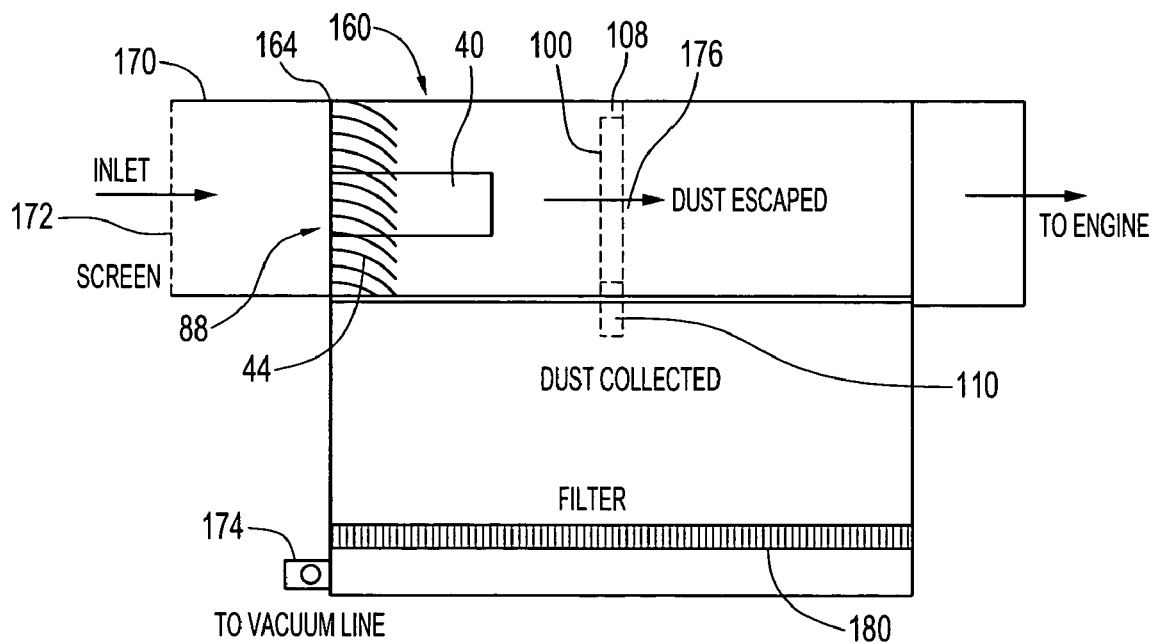

For example, FIGS. 15A and 15B show a pair of modules 88 (single annular) in the twin module particle separation system 160, tested in front of an engine (not shown). Dusty air enters an inlet 164 of both particle separation modules 88 of the twin device module 80 through a guide 170 having a screen 172 for initial filtering of the air. After passing through the twin device modules 88, part of the entering air goes to a vacuum line 174, and the rest goes in a path 176 leading to the engine (not shown). The engine intake air may be used to create pressure and draw the air through the particle separation system 160. The dust collected by the particle separation system 100 follows through the chute 110, and drops onto a filter 180 for collection. The escaped dust that bypasses the modules 88 is captured by the engine filters.

A number of inventive particle separation devices and systems have been shown and described having a number of features and advantages. For example, the particle separation device 20 having the arced inlet vanes 44 can preferably separate particles down to below 4 μm. Energy consumption for air cleaning is relatively small, due to a smaller required pressure drop.

The inventive particle separation device can preferably be used for air cleaning in both indoor and outdoor air, and in various applications such as, but not limited to, removing power plant exhaust smoke, home air recirculation, animal buildings, workshops, and other industrial locations.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. An apparatus for removing particles from a fluid, the apparatus comprising:
a separation chamber having an annular tunnel to accept fluid flow;
a plurality of inlet vanes within the annular tunnel having a discharge angle for deflecting the fluid flow to impart a helical flow to fluid in the separation chamber, each of the plurality of inlet vanes having a surface that is curved in three dimensions such that a deflection angle of the surface of each of the plurality of inlet vanes varies substantially smoothly from an angle at an entrance of the vanes allowing fluid flow along an axial direction as the fluid enters the vanes to the discharge angle at an exit of the inlet vanes as the fluid exits the vanes;
an outlet in fluid communication with the separation chamber, the outlet being configured to pass fluid having the particles removed;
a collection device for collecting the particles;
a pressure generating device for moving the fluid through the inlet vanes and through the separation chamber.

2. The apparatus of claim 1 wherein the inlet vanes are shaped such that flow of the fluid along an entire surface of each of the inlet vanes is in an elliptical motion, and in a substantially circular motion when viewed along the axial direction from the entrance of the inlet vanes to the exit of the inlet vanes.

3. The apparatus of claim 2 wherein the annular tunnel is defined between an inner member and an outer cylinder, and wherein each the inlet vanes is configured so that, for an arbitrary point on the surface of the inlet vane, $$z = r\sqrt{\frac{\pi}{90}\beta - \left(\frac{\pi}{180}\beta\right)^2},$$

where
z=distance along the axial direction between an entrance of the vane along an x-y plane, and the arbitrary point;
r=radial position of the arbitrary point on the x-y plane, $r \geq$ the radius of the inner member, and the radius of the outer cylinder $\geq r$; and
β=discharging angle of the vane projected on the x-y plane for the arbitrary point, in degrees.

4. The apparatus of claim 2 wherein the annular tunnel is defined between an inner member and an outer cylinder, and each of the plurality of inlet vanes is defined between an inner contour intersecting the inner member and an outer contour intersecting the outer cylinder, and wherein a tangential angle of both the inner contour and the outer contour varies substantially smoothly from an initial tangential angle that is parallel with the axial direction to an end tangential angle equal to the discharge angle.

5. The apparatus of claim 1 wherein the plurality of vanes are disposed symmetrically about the annular tunnel.

6. The apparatus of claim 1 wherein each of the plurality of vanes are formed integrally with the inner member.

7. The apparatus of claim 1 wherein the apparatus further comprises a plurality of particle separation modules, each of the particle separation modules including the separation chamber having the annular tunnel and the plurality of inlet vanes.

8. The apparatus of claim 7 wherein the outlet comprises a plurality of individual fluid outlets in fluid communication with the separation chamber of each of the plurality of particle separation modules.

9. The apparatus of claim 7 wherein the plurality of particle separation modules is formed into a casing.

10. The apparatus of claim 7 wherein the modules are arranged in an array.

11. The apparatus of claim 1 wherein the apparatus further comprises at least one multi-annular particle separation module having a plurality of the annular tunnels arranged concentrically, each of the plurality of the annular tunnels including a plurality of the inlet vanes.

* * * * *